United States Patent
Bates et al.

(10) Patent No.: US 10,621,602 B2
(45) Date of Patent: Apr. 14, 2020

(54) REINFORCEMENT MACHINE LEARNING FOR PERSONALIZED INTELLIGENT ALERTING

(71) Applicant: ADOBE INC., San Jose, CA (US)

(72) Inventors: John Bevil Bates, Highland, UT (US); Ryan Elliott Cobourn, Draper, UT (US); Benjamin Russell Gaines, Highland, UT (US); Brooke Suzanne Wyckoff, Lehi, UT (US)

(73) Assignee: ADOBE INC., San Jose, CA (US)

( * ) Notice: Subject to any disclaimer, the term of this patent is extended or adjusted under 35 U.S.C. 154(b) by 924 days.

(21) Appl. No.: 14/861,772

(22) Filed: Sep. 22, 2015

(65) Prior Publication Data
US 2017/0083929 A1  Mar. 23, 2017

(51) Int. Cl.
*G06Q 30/02* (2012.01)
*G06Q 10/06* (2012.01)
(Continued)

(52) U.S. Cl.
CPC ....... *G06Q 30/0204* (2013.01); *G06F 16/951* (2019.01); *G06N 20/00* (2019.01); *G06Q 10/067* (2013.01)

(58) Field of Classification Search
None
See application file for complete search history.

(56) References Cited

U.S. PATENT DOCUMENTS

| 7,092,929 B1* | 8/2006 | Dvorak | G06Q 10/087 705/28 |
| 7,107,339 B1* | 9/2006 | Wolters | H04L 41/142 709/224 |

(Continued)

OTHER PUBLICATIONS

Kaushik, A. (Jun. 2010). Identifying the Known Unknowns: Leverage Analytics Custom Alerts. Retrieved Apr. 3, 2018 from the Internet at <https://www.kaushik.net/avinash/leverage-web-analytics-custom-alerts/>. 12 pages.

(Continued)

*Primary Examiner* — Octavian Rotaru
(74) *Attorney, Agent, or Firm* — Shook, Hardy & Bacon L.L.P.

(57) ABSTRACT

Embodiments of the present invention relate to providing intelligent alerting and automation for marketing analytics software. In implementation, intelligent alerting is initiated by a user, which enables deep learning models to analyze various data patterns. Intelligent alerting learns about preferences and data consumption patterns of the user with marketing analytics software. Intelligent alerting also accounts for and learns from any manually created alerts set up by the user and/or alerts created automatically by anomaly detection. Intelligent alerting analyzes all other users within the organization of the user to find similar users based on their consumption patterns. An on-demand game may be provided to the user to determine the criticality of one metric change over another. This enables intelligent alerting to automatically provide alerts which pass a critical threshold of importance to the user and context to help the user understand why a metric changes in a significant way.

6 Claims, 12 Drawing Sheets

(51) Int. Cl.
*G06N 20/00* (2019.01)
*G06F 16/951* (2019.01)

(56) References Cited

U.S. PATENT DOCUMENTS

| | | | | |
|---|---|---|---|---|
| 7,209,955 | B1* | 4/2007 | Major | G06F 16/9535 709/207 |
| 7,249,159 | B1 | 7/2007 | Horvit et al. | |
| 7,836,175 | B2* | 11/2010 | Bronoel | G06Q 10/00 709/219 |
| 7,962,425 | B1* | 6/2011 | Oakenfull | G06F 9/5072 706/10 |
| 7,975,015 | B2 | 7/2011 | Horvitz et al. | |
| 7,987,234 | B1* | 7/2011 | Waldorf | G06T 11/206 707/722 |
| 8,775,917 | B2* | 7/2014 | Bourke | G06F 17/2247 715/200 |
| 8,823,507 | B1* | 9/2014 | Touloumtzis | H04L 67/24 340/501 |
| 8,849,806 | B2* | 9/2014 | Walker | G06Q 10/109 707/723 |
| 9,082,282 | B1* | 7/2015 | Landefeld | G06Q 10/10 |
| 9,191,285 | B1* | 11/2015 | Isaacson | H04L 41/5009 |
| 9,235,978 | B1* | 1/2016 | Charlton | G06F 9/542 |
| 9,299,170 | B1* | 3/2016 | Moon | G06T 11/003 |
| 9,846,772 | B1* | 12/2017 | Satish | G06F 21/566 |
| 9,883,358 | B2* | 1/2018 | Kalkounis | H04W 76/10 |
| 9,891,807 | B1* | 2/2018 | Landefeld | G06F 3/04847 |
| 2001/0037399 | A1* | 11/2001 | Eylon | G06F 17/30067 709/231 |
| 2002/0038217 | A1* | 3/2002 | Young | G06Q 10/063114 705/7.15 |
| 2002/0099598 | A1* | 7/2002 | Eicher, Jr. | G06Q 10/06 705/28 |
| 2004/0003097 | A1* | 1/2004 | Willis | G06F 17/30867 709/228 |
| 2004/0254938 | A1* | 12/2004 | Marcjan | G06F 16/148 |
| 2007/0033103 | A1* | 2/2007 | Collins | G06F 17/2785 705/14.41 |
| 2007/0094384 | A1* | 4/2007 | Matsumura | G06Q 10/10 709/224 |
| 2009/0089869 | A1* | 4/2009 | Varghese | G06F 21/31 726/7 |
| 2009/0210510 | A1* | 8/2009 | Bouazizi | H04N 7/162 709/207 |
| 2010/0274866 | A1* | 10/2010 | Hammad | G06Q 20/202 709/207 |
| 2010/0318487 | A1* | 12/2010 | Marvasti | G06N 99/005 706/47 |
| 2011/0060649 | A1* | 3/2011 | Dunk | G06F 17/3002 705/14.53 |
| 2011/0148632 | A1* | 6/2011 | Chin | G06Q 10/109 340/540 |
| 2011/0258683 | A1* | 10/2011 | Cicchitto | G06F 21/604 726/4 |
| 2011/0307354 | A1* | 12/2011 | Erman | G06F 8/60 705/27.1 |
| 2012/0011242 | A1* | 1/2012 | Suchter | G06F 11/3006 709/224 |
| 2012/0101952 | A1* | 4/2012 | Raleigh | G06Q 30/016 705/304 |
| 2012/0278194 | A1* | 11/2012 | Dewan | G06F 11/0742 705/26.1 |
| 2013/0006678 | A1* | 1/2013 | Bellotti | G06Q 10/109 705/7.11 |
| 2013/0049948 | A1* | 2/2013 | Ali | G06Q 30/0629 340/501 |
| 2013/0268357 | A1* | 10/2013 | Heath | H04L 63/00 705/14.53 |
| 2014/0129661 | A1* | 5/2014 | Thyagaraja | G06F 9/542 709/207 |
| 2014/0365450 | A1* | 12/2014 | Trimble | G06F 17/30156 707/692 |
| 2015/0212674 | A1* | 7/2015 | Firstenberg | G06F 3/0484 715/747 |
| 2015/0348042 | A1* | 12/2015 | Jivraj | G06Q 20/322 705/44 |
| 2015/0364022 | A1* | 12/2015 | Dyell | A61B 5/746 340/573.1 |
| 2016/0004988 | A1* | 1/2016 | Kunapuli | G06Q 10/06393 705/7.39 |
| 2016/0342911 | A1* | 11/2016 | Kannan | G06Q 10/0631 |
| 2017/0083965 | A1* | 3/2017 | Sun | G06F 17/30 |

OTHER PUBLICATIONS

Kahuna. (Sep. 2014). How to Send Great Notifications via Smart Watches & Wearables. Retrieved Apr. 3, 2018 from the Internet at <https://www.kahuna.com/blog/how-to-send-great-notifications-through-smart-watches-wearables/>. 4 pages.

XMatters (Aug. 2014). Eliminate Alert Fatigue by Creating a CUlter of Intelligent Communication. IT Communications eGuide. Retrieved Apr. 3, 2018 from the Internet at <http://info.xmatters.com/rs/alarmpoint/images/IT-Communicaiton-eGuide.pdf>. 9 pages.

Eizenberg, E. (Apr. 2013). Five Frustrating Types of Alert Spam . . . and What to Do About Them. Bigpanda blog. Retrieved Apr. 3, 2018 from the Internet at <https://bigpanda.io/blog/five-frustrating-types-of-alert-spam-and-what-to-do-about-it/>. 6 pages.

* cited by examiner

FIG. 5 ating on-demand games provided by intelligent alerting, in/accordance with embodiments of the present invention;

REINFORCEMENT MACHINE LEARNING FOR PERSONALIZED INTELLIGENT ALERTING

BACKGROUND

Business users have little time to perform analysis and manage every decision that must be made each day with respect to the large amounts of data being collected across various sources. Additionally, the velocity of the data being collected creates a challenge for business users to maintain a "pulse" on the health of their business. These users need to be alerted when aberrations or anomalous changes occur in their data. This often requires users to manually set up hundreds or thousands of alerts as well as select a meaningful threshold to trigger each alert and identify the aberrations or anomalous changes. Unfortunately, with increasingly large amounts of data and at the velocity the data is being collected, manually selecting a meaningful threshold for every alert is not possible.

Additionally, once these alerts are provided, users need any resulting analyses, process, and workflows to be streamlined. Although most marketing analytics software provides basic alerting functionality, these technologies fall short in intelligently focusing communication on the most relevant and important metric changes from among the flood of alerting noise. Because current technology both fails to discriminate the value and importance of different alerts and fails to apply analysis in order to combine alerts found to be similar, the recipients of the alerts and notifications experience a high degree of alert fatigue.

SUMMARY

Embodiments of the present invention relate to providing intelligent alerting and automation for marketing analytics software. A user initiates an intelligent alerting process, which employs deep learning models to analyze various data patterns to learn about preferences and data consumption patterns of the user, such as by analyzing the frequency, recency, and data query patterns of a user utilizing marketing analytics software. The user's data queries are also analyzed for combinations of segments, time granularity, metrics, dimensions, and dimension items to determine relevance of different data artifact combination that may be more valuable or relevant to the user. Intelligent alerting also accounts for and learns from any manually created alerts set up by the user, which may also include alerts created by anomaly detection. Intelligent alerting analyzes other users within the user's organization to find similar users based on their consumption patterns. This helps identify suggested alerts that the user may find interesting. An on-demand game is provided to the user to determine the criticality of one metric change over another. In this way, intelligent alerting is able to automatically provide alerts that pass a critical threshold of importance to the user and provide context to help the user understand why a metric changes in a significant way.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIGS. 4-6 are exemplary graphical user interfaces illustrating on-demand games provided by intelligent alerting, in/accordance with embodiments of the present invention;

DETAILED DESCRIPTION

Figure 1:
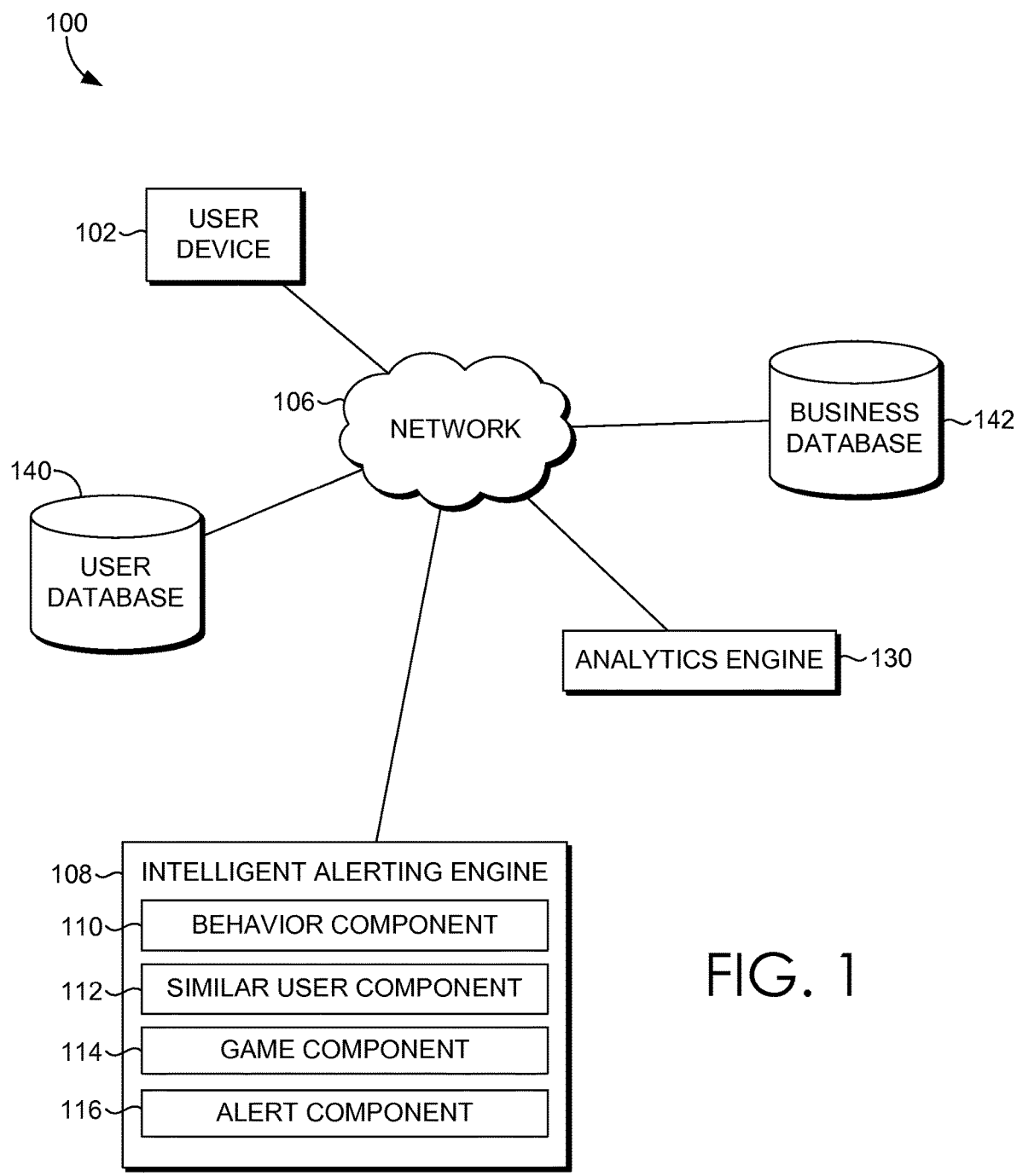
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

The term "intelligent alerting" refers to an automated process that employs machine learning to create individually tailored alerts and associated thresholds for users based on a variety of factors, including, for example, user behavior, consumption patterns, and anomaly detection. The alerts are communicated to the user and context is automatically provided for the alert. Feedback from the user provides reinforced learning to the machine learning models.

A "consumption pattern" includes frequency, recency, and data query patterns of the user based on interactions with marketing analytics software.

The term "user" refers to a user of marketing analytics software.

A "similar user" refers to other users that have been identified as having similar consumption patterns as the user.

An "executive user" refers to an executive or manager of a business that does not normally interact with marketing analytics software except for certain alerts that are escalated to the executive user.

An "analyst" refers to the user of marketing analytics software that screens alerts on behalf of the executive user.

The term "anomaly" refers to an instance of data that has been determined to be associated with statistically significant changes and may represent an unknown-unknown, as defined below.

The term "context" includes information that indicates to a user why a particular metric has changed and triggered an alert.

"Metrics" refers to quantifiable measures used to track, monitor, and assess the success or failure of various business processes (e.g., revenue, orders, conversion, page views, visits, click through rate, product views, and the like).

"Suggested alerts" represent alerts suggested by intelligent alerting that the user may be interested in but has not yet manually created. The suggested alerts are based on machine learning processes that have analyzed consumption patterns, similar users, anomalies, and the like.

A "selected alert" represents suggested alerts that have been selected by the user, such as by the user providing positive feedback to the suggested alerts.

A "known-known" represents issues in the data that are expected. A known-known is identified by setting a target value.

A "known-unknown" represents issues in the data that are expected to happen, but it is not known when they will happen. A known-unknown is often identified by setting a threshold.

An "unknown-unknown" represents issues in the data that a user does not anticipate. In other words the unknown-unknowns represent changes in the data that are not apparent. These are detected by anomaly detection, as described herein.

As discussed previously, although current marketing analytics software provides basic alerting functionality, these technologies fall short in intelligently focusing communication on the most relevant and important metric changes from among the flood of alerting noise. The failure to discriminate the value and importance of different alerts and apply analysis in order to combine alerts found to be similar, results in a high degree of alert fatigue. Even when business users manually set up alerts, it is time- and cost-prohibitive for the user to select meaningful thresholds to trigger each alert and actually identify when aberrations or anomalous changes occur. Consequently, current marketing analytics software only enables a user to create arbitrary thresholds that alert for "known-knowns" and "known-unknowns", but is unable to timely identify "unknown-unknowns". Moreover, it is time- and cost-prohibitive for the user to understand why the aberrations or anomalous changes are occurring.

Embodiments of the present invention generally relate to providing intelligent alerting and automation for marketing analytics software. Intelligent alerting provides a personalized experience for the user that includes combinations of triggers and actions that can be integrated with tools commonly used by analysts, marketers, and technologists (e.g., ADOBE MARKETING CLOUD (AMC), JIRA, TRELLO, electronic mail, DROPBOX, SALESFORCE, TWITTER, etc.). Intelligent alerting leverages reinforcement learning and other heuristics to deliver the right alerts to the appropriate users based on the information most valuable and relevant to the user. In this way, intelligent alerting notifies a user of issues, critical events, and/or anomalies related to the marketing processes for which the user is responsible, without ever requiring the user to manually create an alert or identify the "unknown-unknowns". To do so, intelligent alerts utilizes machine learning to learn about preferences and data consumption patterns of the user and also to find similar users to the user. Each of these machine learning processes help the system to provide alert suggestions to the user.

Initially, an indication is received from a user to activate intelligent alerting. In various embodiments, the intelligent alerting employs machine learning to analyze a consumption pattern of a user, analyze other users to identify similar users based on the consumption patterns of the other users, and/or provide an on-demand personalized game to determine the criticality of one metric change over another. Consumption patterns refer to data collection and automated analysis that indicate how a unique user of marketing analytics software uses the product. For example, the system learns which reports a user queries, how often, which dimension item breakdowns are applied, which metrics are applied to reports, which segments are applied to reports, the most frequently applied metrics (to indicate KPIs), etc. The system also learns the consumption patterns of all other users of the marketing analytics software and classifies users into clusters with other users that are similar to one another (but very dissimilar in their consumption patterns from other clusters/groups of users).

Machine learning leverages numerous algorithms like unsupervised user clustering based upon attributes that provide maximum entropy. Combined with anomaly detection (based on simple, double, and triple exponential smoothing time-series forecasting models), enabling the user to timely identify "unknown-unknowns", the user receives suggestions or recommendations on significant movements in the data. The suggested alerts are provided to the user along with meaningful thresholds as determined by the machine learning algorithms. In some embodiments, the machine learning algorithms include clustering algorithms (e.g., expectation-maximization (EM), K-means, etc.), decision trees (e.g., classification and regression trees (CART)), or propensity models (e.g., logistic regression). The suggested alerts are determined by the machine learning algorithms to have a likelihood of being of interest to the user. As described below, the suggested alerts include marketing reports that a user is likely to view based on the learned consumption patterns. An indication of selected alerts is received from the user via feedback (e.g., like or not like), indicating which suggested alerts the user prefers, allowing the alerts to be created without requiring the user to manually create them. This feedback can also be leveraged by the machine learning algorithms to improve the relevance and value of future suggestions.

Alerts can be based on either manual rules set by the user or uncovered by the intelligent learning system as a recommendation. These alerts are then clustered together when they represent the same related event and sent as a single alert (rather than many alerts). Once a particular metric has changed in accordance with a threshold of one or more of the selected alerts, the one or more alerts are communicated to the user. When an alert for a metric is triggered, the system also automates an ADOBE Contribution Analysis (using Chi-squared and Pearson's residual), which queries every data being collected by the system, analyzes each dimension item for statistical significance in explaining the anomaly and then generates a ranked list of the most significant contributing factors. This provides a scaled contextual analysis into what may be driving the anomalous change in the data within seconds to minutes.

Further, the criticality of one metric change over another is determined by a gamification experience provided by intelligent alerting. Within the gamification experience, the user can rate metrics on importance (e.g., by providing a 1-5 ranking) across as many metrics as desired. The user can also play a game that randomly generates data duels in which the user is presented with a choice of which metric change is more critical between two options (e.g., a small increase in visits vs. a large increase in revenue, etc.). The gamification experience can be played on-demand, which immediately increases the intelligence of the system.

In addition, issues, critical events, and/or anomalies related to the same macro event (e.g., an anomalous spike in revenue, orders, and conversion for the same period) are combined and/or deduplicated. Intelligent alerting also provides alerts that not only contain the event that triggered the alert but also observations for associated events that provides context to the user for what caused the event. Alerts are delivered, in various embodiments, via electronic mail, short message service (SMS) text, AMC notification, social (obfuscated tweet or FACEBOOK message, etc.), and/or in-app push notifications (via a mobile application). In these ways, intelligent alerting greatly reduces alert fatigue and incorporates self-learning filters and summarization.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as environment 100. The environment 100 of FIG. 1 includes a user device 102, an intelligent alerting engine 108, an analytics engine 130, a user database 140, and a business database 142. Each of the user device 102, intelligent alerting engine 108, analytics engine 130, user database 140, and business database 142 may be, or include, any type of computing device (or portion thereof) such as computing device 1200 described with reference to FIG. 12, for example. The components may communicate with each other via a network 106, which may include, without limitation, one or more local area networks (LANs) and/or wide area networks (WANs). Such networking environments are commonplace in offices, enterprise-wide computer networks, intranets, and the Internet.

It should be understood that any number of user devices, intelligent alerting engines, analytics servers, and/or databases may be employed within the environment 100 within the scope of the present invention. Each may comprise a single device or multiple devices cooperating in a distributed environment. For instance, the intelligent alerting engine 108 and/or analytics engine 130 may be provided via multiple devices arranged in a distributed environment that collectively provide the functionality described herein. Similarly, all or portions of the functionality provided by the intelligent alerting engine 130 may be provided by other components, such as the user device 102 or the analytics engine 130. Additionally, other components not shown may also be included within the environment 100, while components shown in FIG. 1 may be omitted in some embodiments.

The user device 102 may be any type of computing device owned and/or operated by a user that can access network 106. For instance, the user device 102 may be a desktop computer, a laptop computer, a tablet computer, a mobile device, a wearable device or any other device having network access. Generally, a user may employ the user device 102 to, among other things, view alerts and/or reports. For example, the user may employ a web browser or application on the user device 102 to access and view the alerts and/or reports generated by the intelligent alerting engine 108.

Each of the user database 140 and the business database 142 may be any type of device capable of hosting and serving data to computing devices, such as the user device 102, the intelligent alerting engine 108, and/or the analytics engine 130. By way of example, and not limitation, each of the user database 140 and/or business database 142 may be a server maintaining user data and/or business data utilized by the intelligent alerting engine 108 to learn what metrics are important to a particular user and other users similar to the particular user that, in turn, provides various functionality to the user device 102.

The intelligent alerting engine 108 is generally configured to facilitate automated alerting for marketing analytics software. Typically, intelligent alerting engine 108 communicates with the analytics engine 130, the user database 140, and the business database 142 to learn about a user and similar users. This enables the intelligent alerting engine 108 to provide suggested alerts to a user via the user device 102. Feedback received from the user via the user device 102 is also utilized by the intelligent alerting engine 108 to provide additional intelligence to the system. In accordance with embodiments described herein, the intelligent alerting engine 108 includes a behavior component 110, a similar user component 112, a game component 114, an alert component 116, and an alert component 116. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In some embodiments, one or more of the illustrated components/modules are implemented as stand-alone applications. In other embodiments, one or more of the illustrated components/modules are integrated directly into the operating system of the intelligent alerting engine 108. The components/modules illustrated in FIG. 1 are exemplary in nature and in number and should not be construed as limiting. Any number of components/modules may be employed to achieve the desired functionality within the scope of embodiments hereof. Further, components/modules may be located on any number of servers, computing devices, or the like. By way of example only, the intelligent alerting engine 108 might reside on a server, cluster of servers, or a computing device remote from or integrated with one or more of the remaining components.

The intelligent alerting engine 108 may be any type of computing device, or incorporated into a computing device, that can access a network (e.g., network 106). For instance, the intelligent alerting engine 108 may be a desktop computer, a laptop computer, a tablet computer, a mobile device, a server, or any other device, or portion thereof, having network access. Generally, a user employs the intelligent alerting engine 118 via the user device 102 to, among other things, provide feedback for suggested alerts, participate in an on-demand game, view alerts and associated context, and/or interact with the alerts and associated context.

In some embodiments, an analyst employs the intelligent alerting engine 108 via the user device 102 to review and/or approve an alert for communication to an executive user (e.g., manager, senior personnel, etc.). For example, an analyst may wish or be required to screen alerts prior to escalating to the executive user. The user initially views the alert communicated by the intelligent alerting engine 108 via the user device 102 to determine whether or not the alert should be escalated. If the user wishes to approve the alert or approve a suggested alert instead, the user does so by providing feedback to the intelligent alerting engine 108 via the user device 102. In some embodiments, based upon the role (e.g., executive user), the confidence level of the underlying anomaly detection model(s) increases (e.g., from 95% to 99%) so as to reduce the chances of false positives and ensure the executive is only receiving alerts for the most extreme changes.

As previously mentioned, in embodiments, the intelligent alerting engine 108 includes a behavior component 110, a similar user component 112, a game component 114, and an alert component 116 to facilitate automated alerting for marketing analytics software. In particular, intelligent alerting engine 108 communicates with the user the analytics engine 130, the user database 140, and the business database 142 to provide suggested alerts to the user via the user device 102. Generally, to initiate intelligent alerting, an indication is received from the user via the user device that indicates the user desires to activate automated alerts and not rely solely on manually created alerts.

The behavior component 110 is generally configured to learn about the preferences and data consumption patterns of the user. In some embodiments, the behavior component 110 employs a machine learning layer to perform the analyses described herein. In some embodiments, the behavior component analyzes the frequency, recency, and data query patterns for any interactions by the user with marketing analytics software, such as the analytics engine 130. In some embodiments, the interactions include interactions with web based interfaces, application programming interfaces (APIs), reports, data warehouses, and the like. For example, the behavior component 110 may determine that the user only views a particular report on a weekly basis, but views a different report twice daily. This indicates that the particular report might be important to the user on a weekly basis, but the different report is important to the user on a much more frequent basis. Similarly, if the behavior component 110 determines the user has not viewed a particular report in nearly a month, but views two other reports nearly every day, the behavior component 110 determines that the particular report is not as valuable to the user as the two other reports.

In some embodiments, the behavior component 110 analyzes data queries for combinations of segments, time granularity, metrics, dimensions, and dimension items to determine relevance of different artifact data combinations that may be more relevant to the user. The behavior component automatically analyzes the individual user's report consumption/user behavior patterns (which reports are opened, when (time of day/day of week), how often, report pathing, API requests, metrics applied to reports, etc.). This helps the machine learning algorithm determine the relative importance/relevance of each dimension, dimension item, metric, segment, data store, etc. in order to qualify which data being collected should be prioritized. For example, the behavior component may identify that a user frequently applies a segment filter (Country=United States) that filters out all non US data for a report (e.g., Products Report) and then adds metric A, B, D, F to the report. While the user may not have explicitly created a manual alert for these metrics, the behavior component 110 uses these report consumption behaviors to uncover significant changes of the data within the context of these segments, metrics, and other report parameters to alert the user with suggestions/recommendations of potentially valuable changes as they occur in the data.

In some embodiments, the behavior component 110 analyzes manually created alerts set up by the user. The manually created alerts are based on subjective rules (e.g., percentage change, absolute change, etc.). For example, the user may have created alerts for issues that are expected (i.e., the known-knowns) or set thresholds for issues that may happen but the user doesn't know when they will happen (i.e., the known-unknowns). The behavior component 110 also analyzes alerts based on statistically significant changes as identified by anomaly detection (i.e., the unknown-unknowns) that have been approved or accepted by the user.

The similar user component 112 is generally configured to analyze other users to identify similar users. To do so, the similar user component 112 analyzes the consumption patterns of the other users. In some embodiments, the similar user component 112 identifies the user has a similar role or title as a portion of the other users that indicates the portion of the other users may be similar users to the user. The similar user component 112 identifies a similarity in consumptions patterns between the user and the other users. If a similarity is detected, the similar user component 112 identifies slight differences in the consumption patterns between the user and the similar users. These slight differences are utilized by the similar user component 112 to suggest additional alerts the user may be interested in giving the user an opportunity to approve or accept the alerts (such as by the user liking a suggested alert identified as an alert similar users utilize). Models such as clustering (e.g., expectation-maximization, K-means, etc.), decision trees (e.g., classification and regression trees), or propensity models (logistic regression) are utilized by the similar user component 112.

In some embodiments, the consumption patterns includes the frequency, recency, and data query patterns for any interactions by the other users with marketing analytics software, such as the analytics engine 130. In some embodiments, the interactions include interactions with web based interfaces, application programming interfaces (APIs), reports, data warehouses, and the like. In some embodiments, the similar user component 112 analyzes data queries for combinations of segments, time granularity, metrics, dimensions, and dimension items to determine relevance of different artifact data combinations that may be more relevant to the similar users. In some embodiments, the similar user component 112 analyzes all other users within the organization of the user to find similar users. Any similarity in the consumption patterns may indicate that at least a portion of the other users may be similar users to the user. As can be appreciated, any or all of these types of analysis by the similar user component 112 is utilized to suggest additional alerts to the user.

The game component 114 is generally configured to provide an on-demand game to the user. The on-demand game facilitates identifying metric importance to the user and takes on a variety of formats. For example, in one embodiment, the game enables the user to rate each metric based on its importance (e.g., on a 1-5 scale) across as many metrics as desired. In another format, the game generates a data duel and present the user with a choice of which metric change is more critical between two options (e.g., a small increase in visits versus a large increase in revenue). The user plays the game on-demand, which immediately increases the intelligence of intelligent alerting by providing an understanding of trade-offs between metrics and the criticality of small versus large changes across different metrics.

The alert component 116 is generally configured to suggest and/or communicate alerts to the user. In various embodiments, the suggested alerts are based on information learned by the behavior component 110, the similar user component 112, and the game component 114. For example, the suggested alerts may be based upon the consumption pattern of a user indicating certain metrics are more important than others. Similarly, the suggested alerts are based upon alerts or slight differences in alerts that similar users utilize. In some embodiments, the suggested alerts are based upon results from the on-demand game that indicate one metric is more critical to the user than another. In some embodiments, the suggested alerts are based upon anomalies in data that have been identified utilizing deep learning models. As described herein, these anomalies are based on statistically significant changes as identified by anomaly detection (i.e., the unknown-unknowns) that have been approved or accepted by the user. In some embodiments, if the user is not consuming the alerts, the alerts are turned off. In these cases, the user is periodically asked if the user would like to opt back in to the alerts. This reduces the amount of noise if the user is not interested in a particular alert(s).

After the alert component 116 has provided any suggested alerts to the user, feedback indicating which alerts the user is actually interested in receiving is received by behavior component 110. The feedback enables the user to provide reinforcement learning to the intelligent alerting engine 108. In some embodiments, feedback is received from the user indicating whether the user wants to include the additional suggested alerts with the selected alerts (such as by the user selecting a like button or thumbs up button to a suggested alert that was identified by anomaly detection). Based on the feedback, it is determined whether to include the additional suggested alerts with the selected alerts.

In some embodiments, it is determined by alert component 116 the one or more alerts will be communicated to an executive user. Prior to communicating the one or more alerts to the executive user, an approval indication has to be received by the alert component 116 from an analyst. Once the approval indication is received from the analyst, the one or more alerts are communicated by alert component 116 to the executive user.

The alert component 116 also provides context to indicate why a particular metric changed. In some embodiments, a device type the user is currently utilizing is determined by alert component 116. The one or more alerts are communicated in a format that is compatible with capabilities of the device type. The alert component 116 further enables the user to communicate the one or more alerts to a second device in a second format that is compatible with a second device type of the second device. The alert component 116 dynamically provides more or less context based on capabilities of the second device type. In some embodiments, the alert component 116 presents alert context in the form of content within the interface that tie the causes/contributing factors that explain the anomaly to the source content. For example, a spike in revenue for the cycling jacket will tie that product to the associated creative content contained in the DAM (digital asset manager within AEM) and show the image of the cycling jacket associated with the alert. In some embodiments, the content is FACEBOOK posts, tweets, campaign images (display ads), website pages, videos, and the like.

Figure 2:
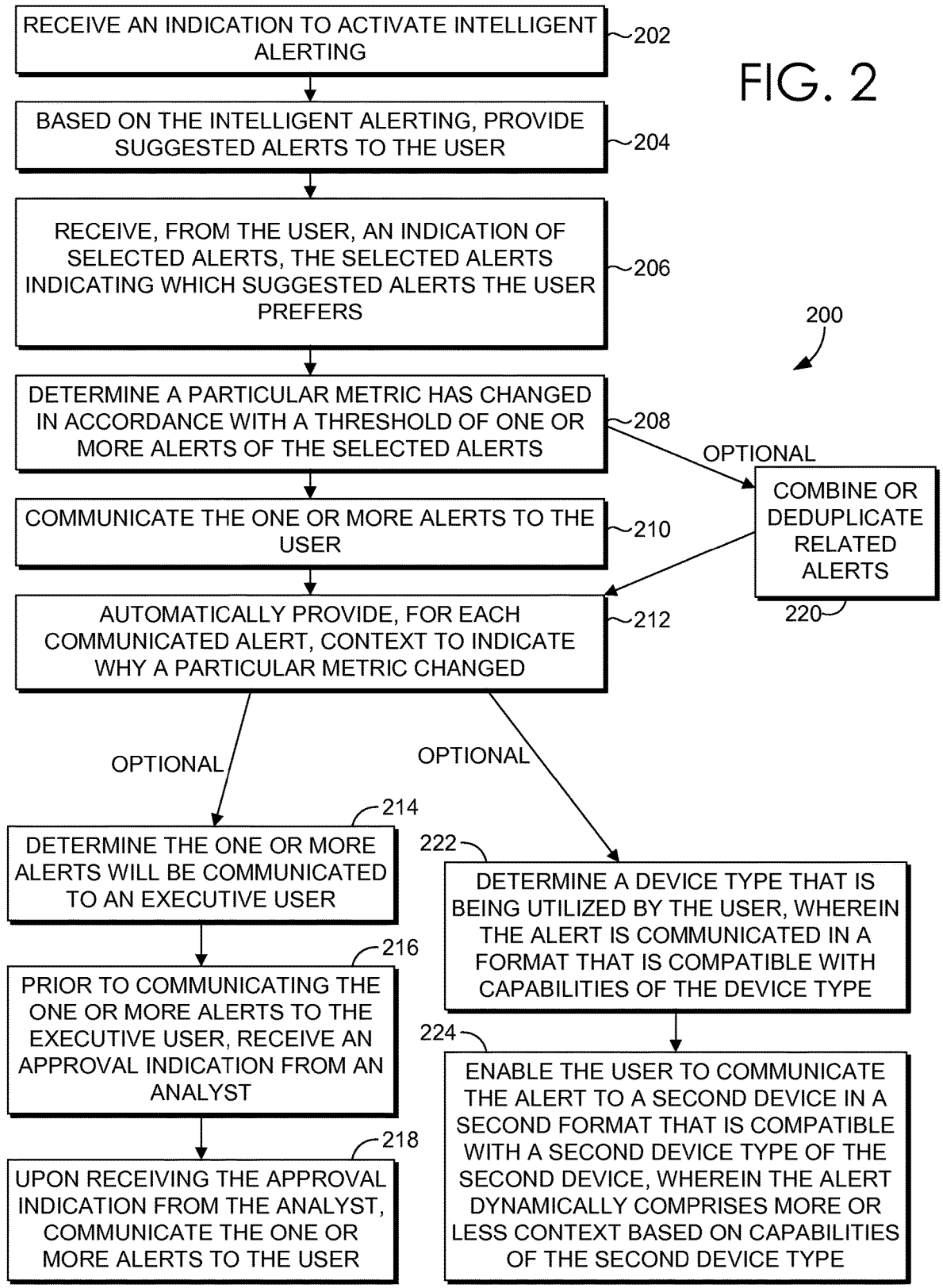
FIGS. 2-3 are flow diagrams showing methods for providing intelligent alerting, in accordance with embodiments of the present invention.

Referring now to FIG. 2, a flow diagram is provided that illustrates a method 200 for providing intelligent alerting, in accordance with an embodiment of the present invention. Such a method can be performed, for example, at an intelligent alerting engine, such as intelligent alerting engine 108 of FIG. 1. Each block of the method 200 and any other method discussed herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 200 may be performed using a computing device, such as the computing device 1200 of FIG. 12.

As shown at step 202, an indication to activate intelligent alerting is received from a user via a user device. Based on the intelligent alerting being activated, suggested alerts are provided to the user at step 204. In some embodiments, the intelligent alerting includes analyzing a consumption pattern of the user. The consumption pattern includes reports the user has manually created, segments, metrics, and granularity associated with the reports, and frequency, recency, and data query patterns of the user. In some embodiments, the analyzing further comprises analyzing data queries for combinations of segments, time granularity, metrics, dimensions, and dimension items to determine relevance of different data artifact combinations for the user.

Additionally or alternatively, the intelligent alerting includes analyzing other users to identify similar users based on the consumption patterns of the other users. Clustering models, decision trees, or propensity models can be utilized to identify similar users and/or slight differences in the alerts utilized by the similar users and the user. These slight differences are utilized to suggest alerts to the user that the user may be interested in.

Additionally or alternatively, the intelligent alerting includes providing an on-demand personalized game to determine the criticality of one metric change over another. The game enables the user, in one embodiment, to rate each metric based on its importance (e.g., on a 1-5 scale) across as many metrics as desired. In another embodiment, the game generates a data duel. The data duel presents the user with a choice of which metric change is more critical between two options (e.g., a small increase in visits versus a large increase in revenue). The on-demand games immediately increase the intelligence of intelligent alerting by providing an understanding of trade-offs between metrics and the criticality of small versus large changes across different metrics.

In some embodiments, the intelligent alerting monitors metrics identified as being more critical/important for real-time significant changes while less important metrics are analyzed less frequently (e.g, daily). Also, significant changes for more critical/important metrics are communicated to the user through more direct communication channels (e.g., mobile/watch push notification, email, SMS text) while significant changes to less important metrics leverage less intrusive communication channels (e.g., AMC notifications, email, etc.).

In some embodiments, anomalies in data are searched for utilizing deep learning models. Based on any identified anomalies, additional suggested alerts are provided to the user. An indication of selected alerts is received from the user, at step 206. The selected alerts indicate which of the suggested alerts or additional suggested alerts the user prefers. In some embodiments, the selected alerts additionally include any manual alerts created by the user. At step 208, a particular metric is determined to have changed in accordance with a threshold of one or more alerts of the selected alerts. As a result, at step 210, the one or more alerts are communicated to the user. Additionally, for each communicated alert, context that indicates why a particular metric changed is automatically provided, at step 212. In some embodiments, related alerts are combined or deduplicated. The related alerts represent the same macro event.

In some embodiments, it is determined, at step 214, that the one or more alerts will be communicated to an executive user. Prior to communicating the one or more alerts to the executive user, an approval indication is received, at step 216, from an analyst. Upon receiving the approval indication from the analyst, the one or more alerts are communicated to the executive user, at step 218.

In some embodiments, a device type is determined, at step 222, that is currently being utilized by the user. The one or more alerts are communicated in a format that is compatible with capabilities of the device type. The user is enabled to communicate the one or more alerts to a second device in a second format that is compatible with a second device type of the second device, at step 224. The one or more alerts dynamically comprise more or less context based on capabilities of the second device type.

Figure 3:
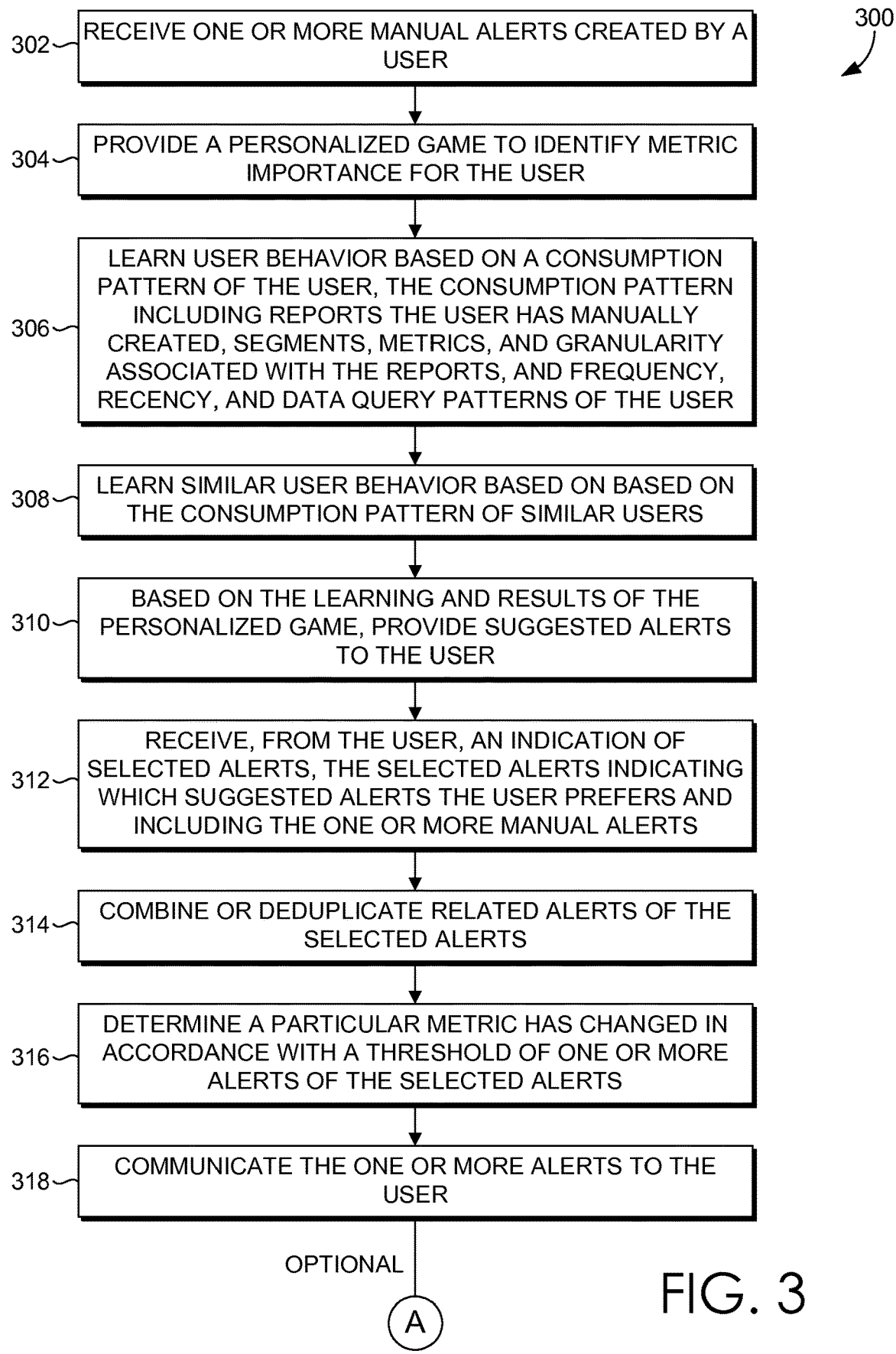
Figure 3:
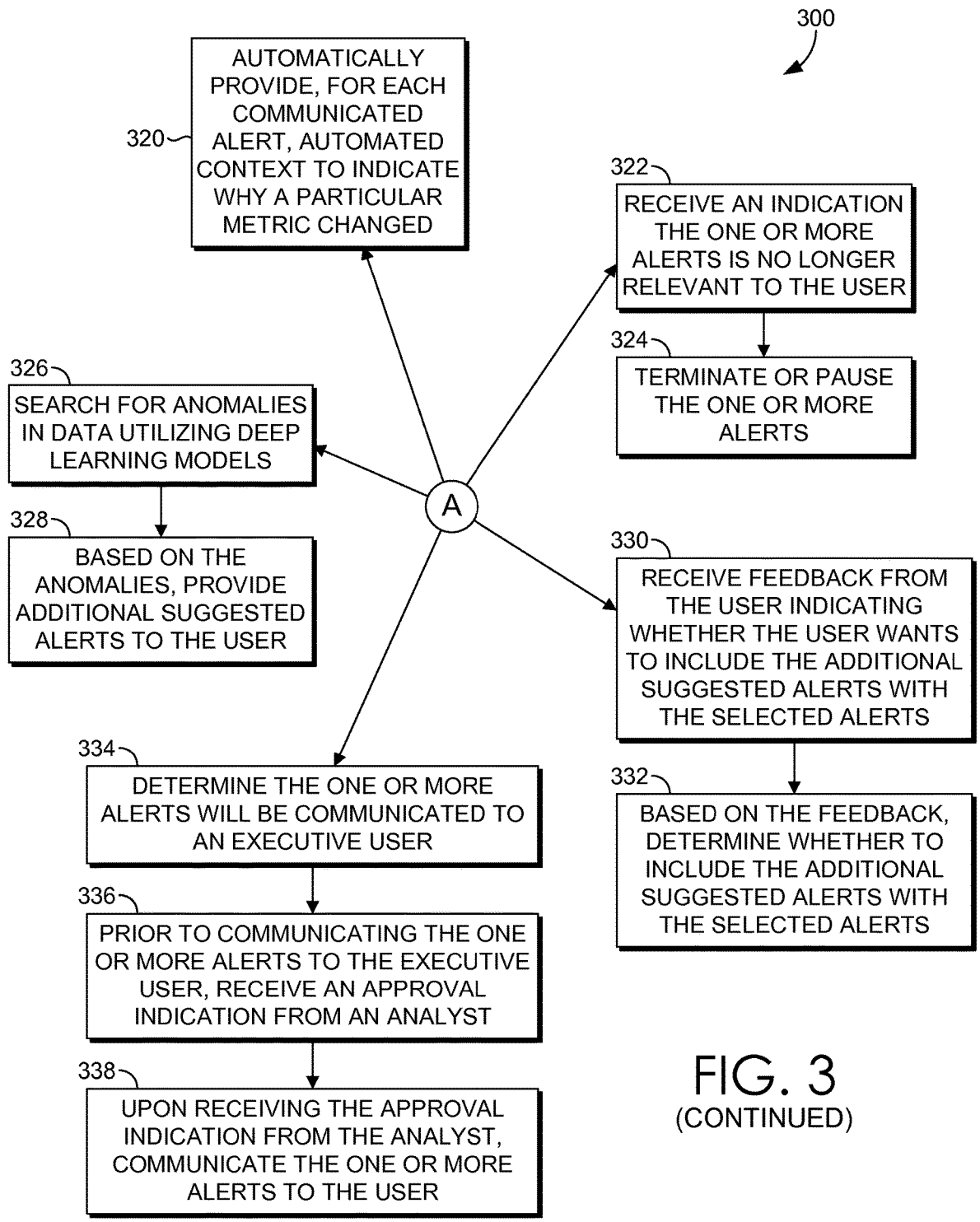

Turning now to FIG. 3, a flow diagram is provided that illustrates a method 300 for providing intelligent alerting, in accordance with an embodiment of the present invention. Such a method can be performed, for example, at an intelligent alerting engine, such as intelligent alerting engine 108 of FIG. 1. As can be appreciated, additional or alternative steps may also be included in different embodiments. Initially, as indicated at step 302, one or more manual alerts created by a user are received via a user device. These manual alerts are based on known thresholds and/or known issues (e.g., known-knowns and/or known-unknowns).

A personalized game is provided, at step 304, that facilitates identifying metric importance to the user. The game enables the user to rate each metric based on its importance (e.g., on a 1-5 scale) across as many metrics as desired. Additionally or alternatively, the game generates a data duel, presenting the user with a choice of which metric change is more critical between two options (e.g., a small increase in visits versus a large increase in revenue). The user plays the game on-demand, which immediately increases the intelligence of intelligent alerting by providing an understanding of trade-offs between metrics and the criticality of small versus large changes across different metrics.

User behavior is learned, at step 306, based on a consumption pattern of the user. The consumption pattern includes reports the user has manually created, segments, metrics, and granularity associated with the reports, and frequency, recency, and data query patterns of the user. Similar user behavior is learned, at step 308, based on the consumption pattern of similar users. In some embodiments, all other users in the organization are analyzed to find similar users. Slight differences in consumption patterns are identified utilizing models such as clustering (e.g., expectation-maximization, K-means, etc.), decision trees (e.g., classification and regression trees), or propensity models (logistic regression). Based on the learning and results of the personalized game, suggested alerts are provided to the user, at step 310. In some embodiments, as shown at step 326, anomalies in the data are searched for utilizing deep learning models. Based on the anomalies, additional suggested alerts are provided to the user, at step 328.

At step 312, an indication of selected alerts is received from the user. In this way, the user is provided an opportunity to select which alerts of the suggested alerts the user prefers (such as by selecting a thumbs up to select the alert or a thumbs down to not select the alert). In some embodiments, the selected alerts include the one or more manual alerts. Feedback is be received from the user, at step 330, indicating whether the user wants to include the additional suggested alerts. Based on the feedback, it can be determined, at step 332, whether to include the additional suggested alerts with the selected alerts.

Related alerts of the selected alerts are combined or deduplicated, at step 314. Related alerts represent the same macro event. For example, alerts may be triggered for decreased revenue, decreased sales, decreased conversions, and the like. However, each of these items may be tied to the same event. Similarly, multiple alerts may be set up via different methods for the same issue (i.e., via manually created alerts, suggested alerts, etc.). Rather than providing a user multiple alerts for the same event many times over the course of a reporting period, these alerts can be combined or deduplicated. In this way, alert fatigue can be greatly reduced by reducing the number of alerts for a single macro event.

A particular metric is determined to have changed, at step 316, in accordance with a threshold of one or more alerts of the selected alerts. This causes the one or more alerts to be communicated, at step 318, to the user. In various embodiments, the alert is delivered via electronic mail, SMS text, AMC notification, social (obfuscated tweet or FACEBOOK message, etc.), and/or in-app push notifications (via a mobile application). In some embodiments, for each communicated alert, automated context is automatically provided, at step 320, indicating why a particular metric changed. For example, the context may indicate that for product views are down because there is a drop-off in views for a particular product. The context may additionally indicate that the drop-off is due to a drop-off for a particular demographic. As can be appreciated, the context enables the user to quickly identify potential causes of the alert automatically and in real-time that may otherwise take the user months of research to identify manually.

In some embodiments, the alerts are communicated in summarized form, allowing the user to select which alerts the user wishes to view in more details or with context. For alerts communicated to smaller displays (e.g., a wearable device), the user can communicate the alert to another connected device with a large screen. This enables the connected device to display more information (e.g., context, other related alerts, etc.) based upon the larger screen.

In some embodiments, as shown at step 322, an indication is received that the one or more alerts is not relevant or no longer relevant to the user. The one or more alerts may be terminated or paused in accordance with the indication, at step 324. This allows bandwidth to be preserved and further decreases alert fatigue. For example, a user may have left a company and a number of alerts selected by the user continue to be communicated. If no interaction is received for any of the alerts (e.g., the user viewing or acknowledging the alert), then that can indicate the one or more alerts should be terminated. Similarly, if a user is simply receiving one or more alerts that are no longer relevant to the user and the user fails to interact with those alerts or identifies them as not relevant (e.g., by selecting a dislike or thumbs down button), the one or more alerts are terminated or paused until the user confirms they are no longer relevant.

In some embodiments, as shown at step 334, it is determined that the one or more alerts will be communicated to an executive user. For instance, an analyst may have created particular alerts that the analyst intends to be escalated to an executive. Prior to communicating the one or more alerts to the executive user, at step 336, an approval indication is received from analyst. This provides the analyst an opportunity that the alerts have enough significance to be escalated to the executive. Upon receiving the approval indication from the analyst, at step 338, the one or more alerts are communicated to the executive user.

Figure 4:
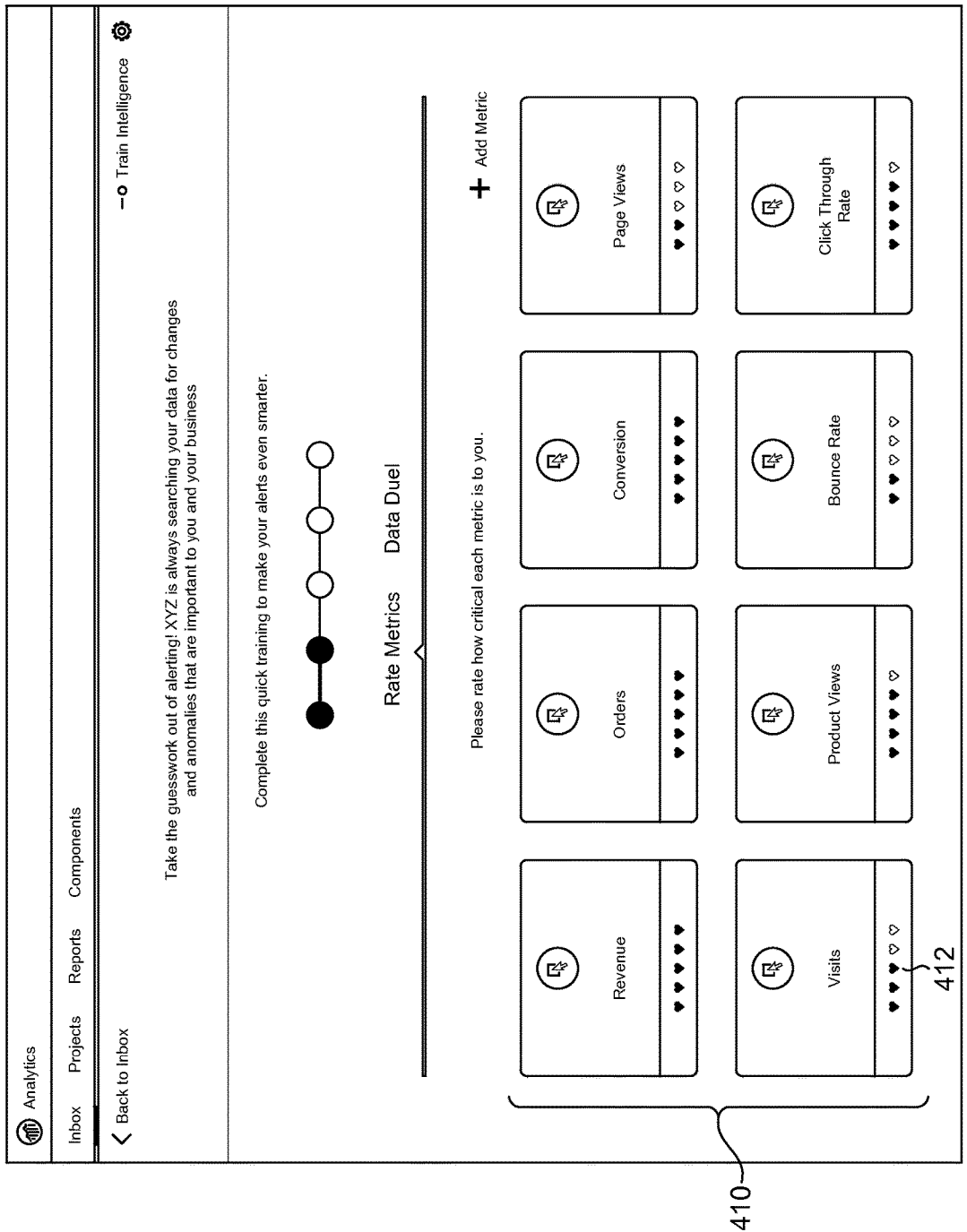

FIGS. 4-11 illustrate various features of intelligent alerting in accordance with embodiments of the present invention. Initially referring to FIGS. 4-6, on-demand games 400, 500, 600 provided by intelligent alerting are illustrated, in accordance with various embodiments of the present invention. FIG. 4 illustrates a game 400 that enables the user to provide feedback and rate various metrics. For example, the user is presented with a variety of metrics. The metrics presented by the game 400 can be based on user behavior (e.g. previous interactions with the intelligent alerting engine 108 and/or the analytics engine 130 of FIG. 1). In some embodiments, the user selects a rating 412 that indicates how critical a particular metric is to the user. In some embodiments, the ratings are prepopulated based on previous feedback received from the user, ratings provided by similar users, and/or machine learning algorithms (e.g., ratings provided by users at other companies, anomaly detection, consumer feedback learned via social media, etc.).

Figure 5:
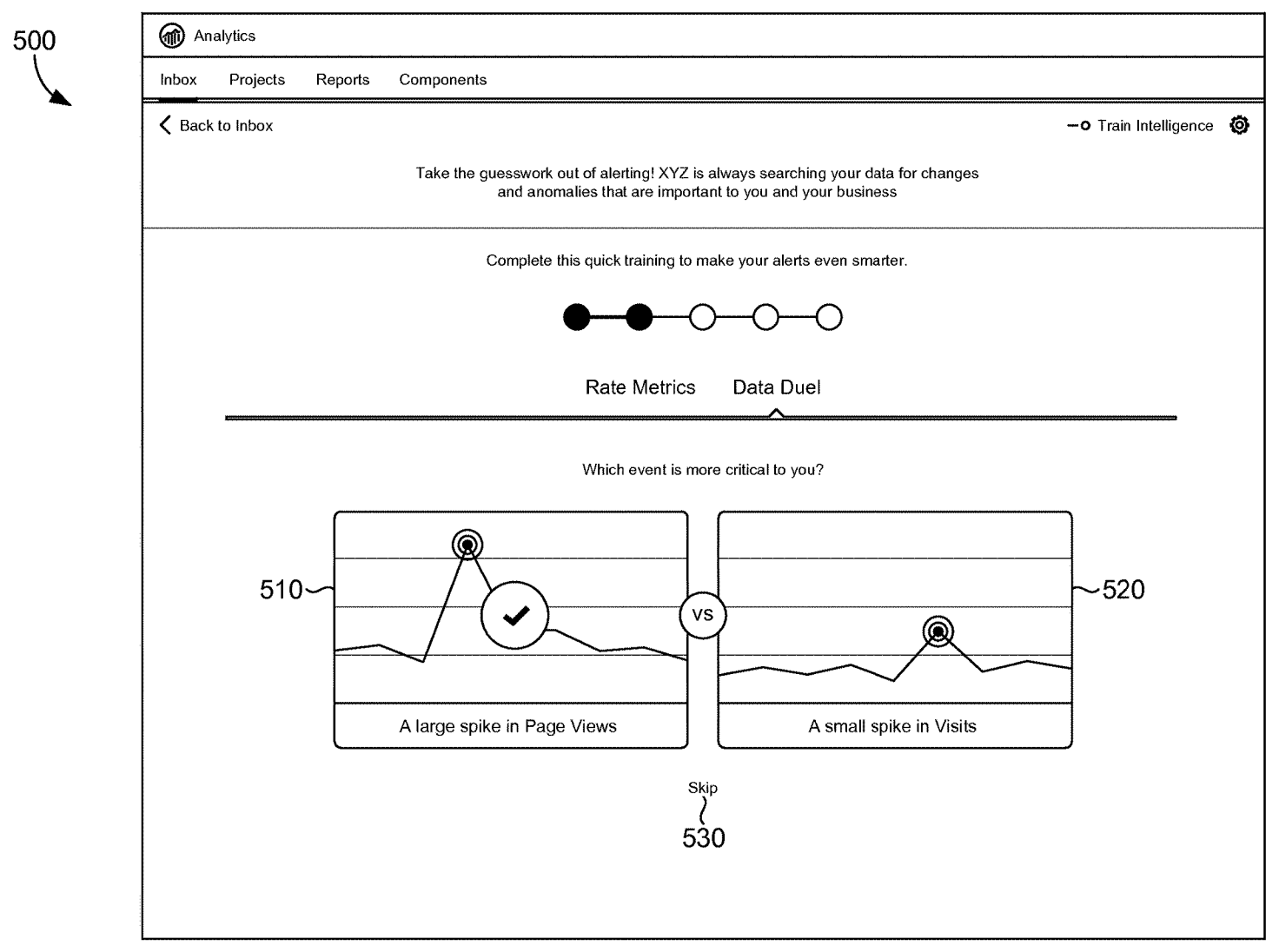

Referring now to FIG. 5, a game 500 enables the user to provide feedback in a data duel between metrics. In the data duel game, the user is presented with a choice of which metric change is more critical between two options 510, 520. In the illustrated example, the options represent "a large spike in page views" 510 versus "a small spike in visits" 520. As the user continues to play the data duel game, the intelligent learning is provided additional intelligent for suggesting and presenting alerts and context. If neither item is critical to the user, the user selects to skip that portion of the duel, such as by selecting a skip button 530.

Figure 6:
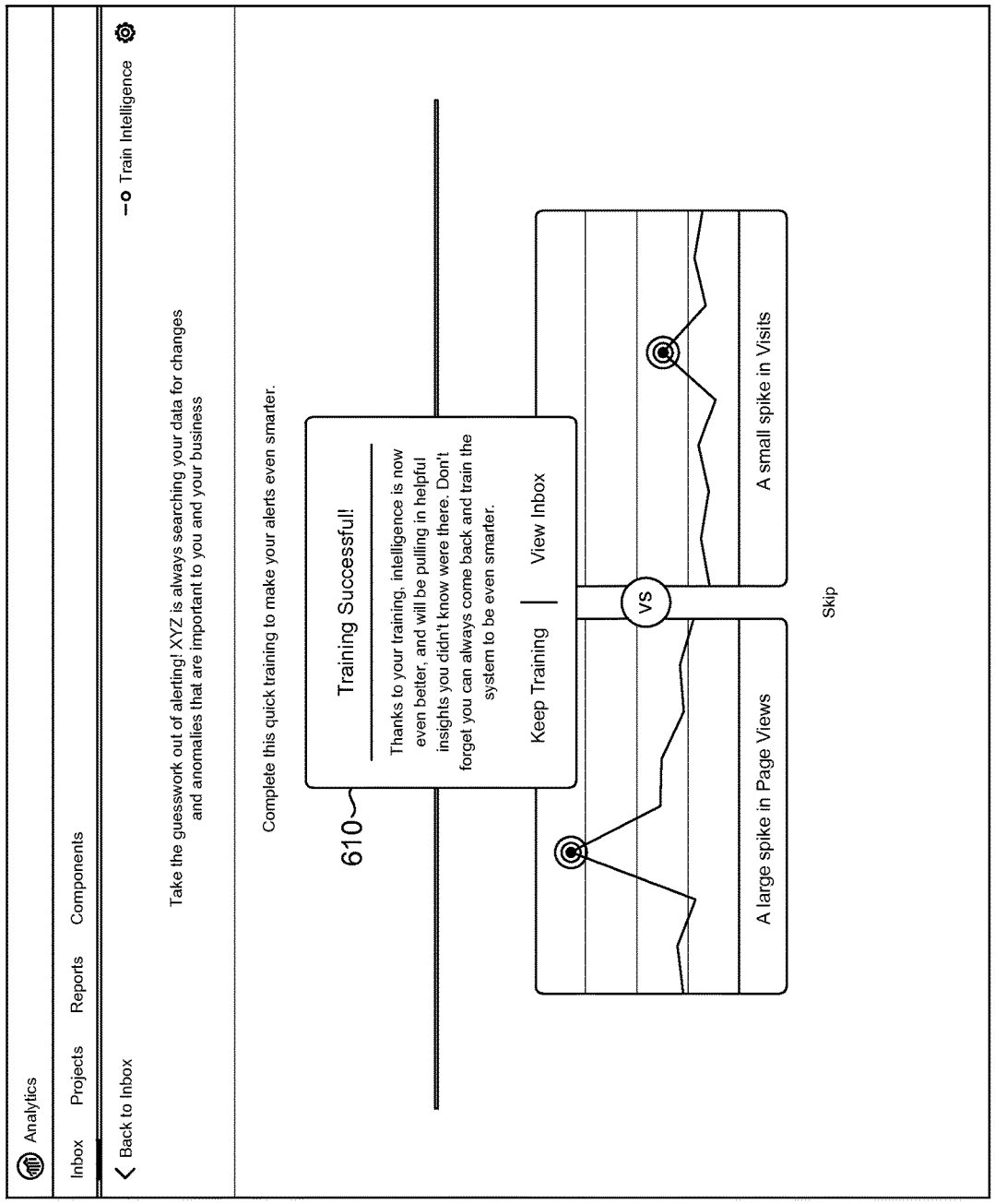

In FIG. 6, the game 600 provides the user the opportunity to determine when to keep training or when to go to an alerts display. The game 600 is also able to determine when it has gathered enough intelligence to suggest or present alerts to the user. The game 600 is able to systematically present the user with choices between metric changes that maximize the entropy of the overall game so that each marginal choice provides diminishing marginal returns of information. A prompt 610 enables the user to continue training or to proceed to view the alerts.

Figure 7:
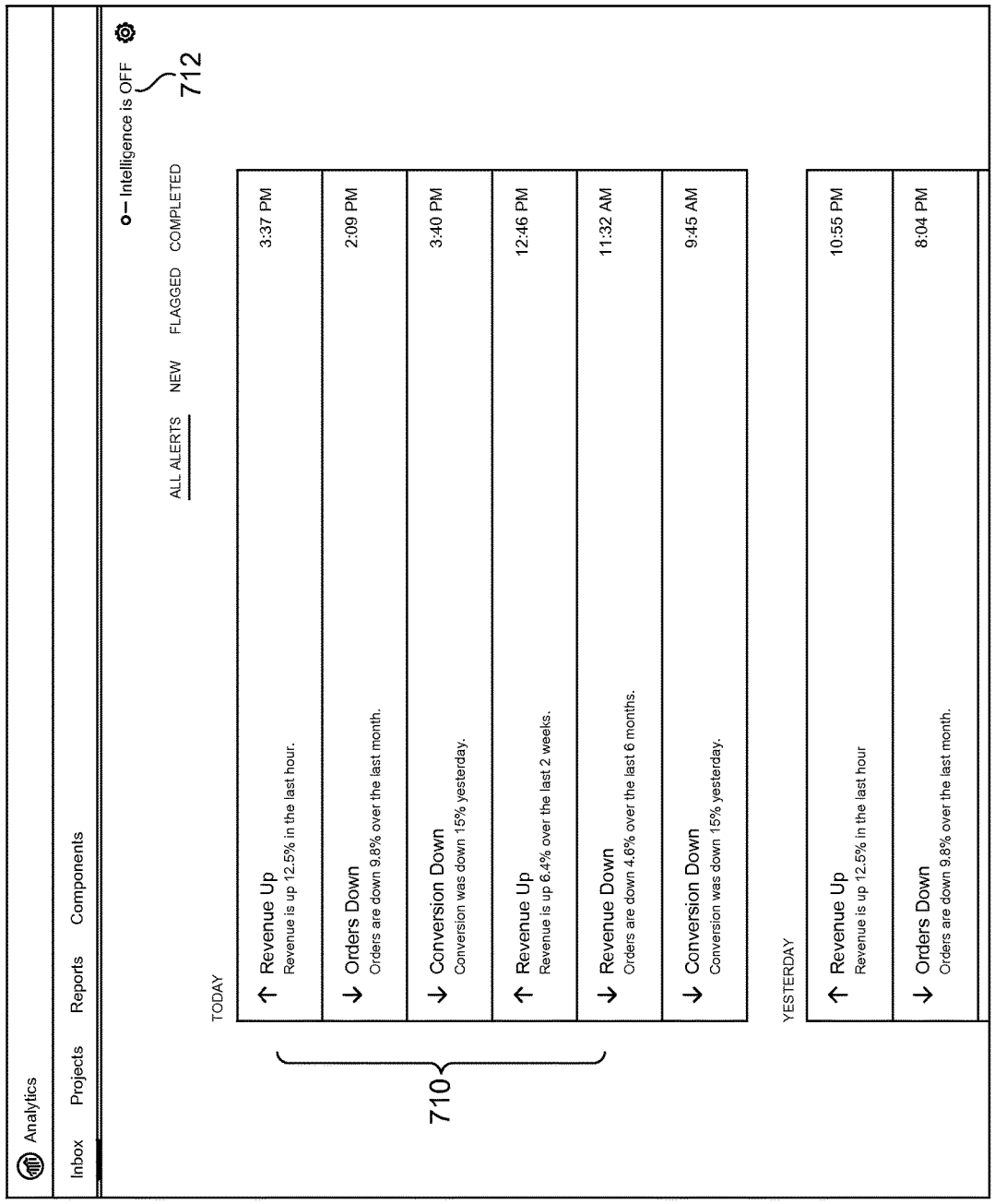
FIG. 7 is an exemplary graphical user interface illustrating alerts presented to a user that has not activated intelligent alerting, in accordance with embodiments of the present invention.

Turning now to FIG. 7, alerts 710 presented to a user that has not activated intelligent alerting are displayed in an alerts interface 700. As illustrated in the intelligence display 712, the intelligence is off. Such an interface 700 only enables alerts 710 that have been manually created to be provided to the user. More importantly, none of the alerts 710 have been combined or deduplicated, which is likely to result in alert fatigue for the user.

Figure 8:
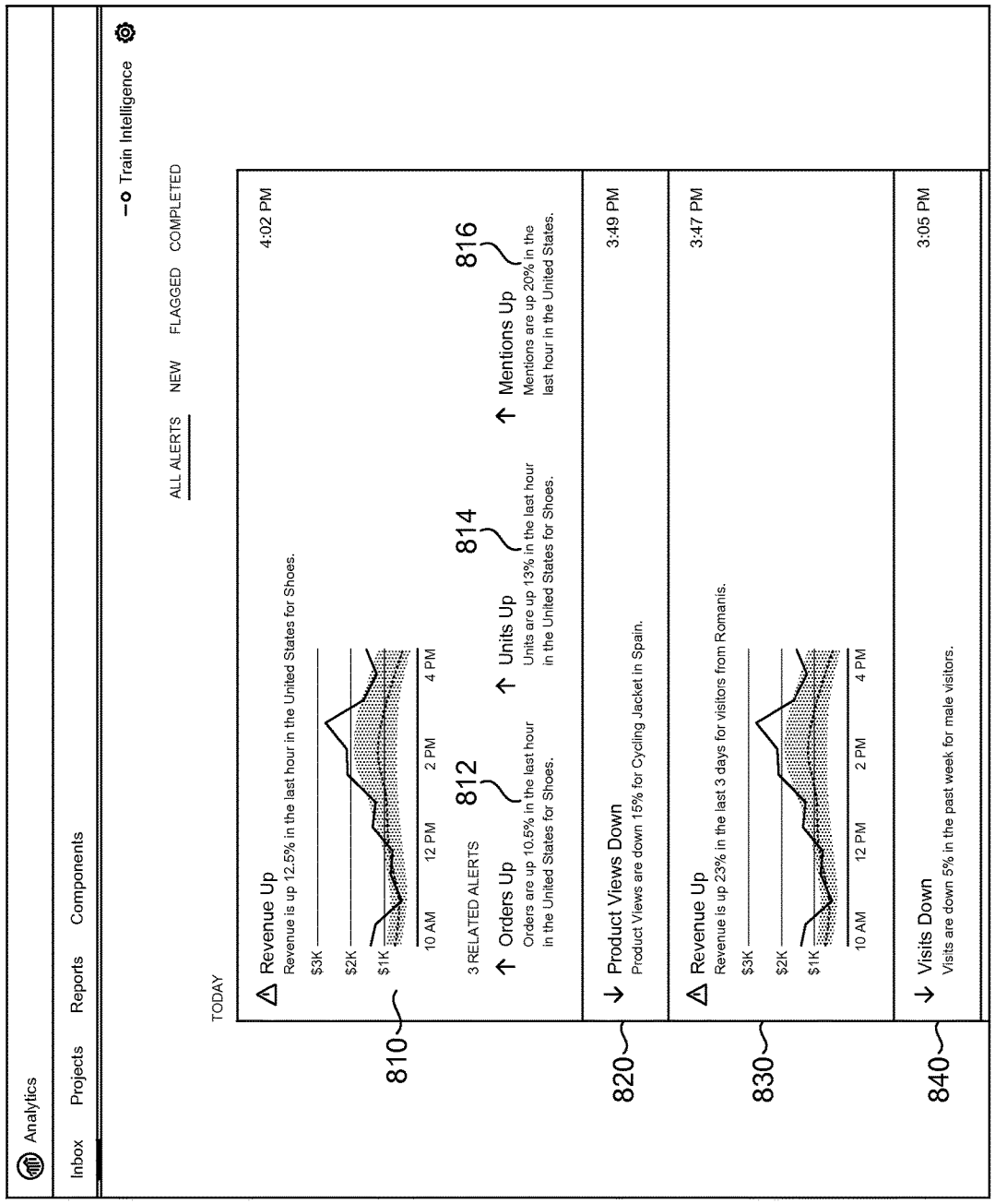
FIG. 8 is an exemplary graphical user interface illustrating intelligent alerts presented to a user, in accordance with embodiments of the present invention.

Referring now to FIG. 8, an alerts interface 800 with intelligent alerting activated is illustrated, in accordance with embodiments of the present invention. As shown, each of the alerts 810, 820, 830, 840 has been either combined or deduplicated resulting in a much more streamlined and meaningful interface 800. For example, the "revenue up in the last hour" alert 810 has been combined with three related alerts, "orders up" 812, "units up" 814, and "mentions up" 816. Additional context is also provided in graphical and textual form as well providing the user with information that has already been determined by intelligent alerting to be relevant to that user.

Figure 9:
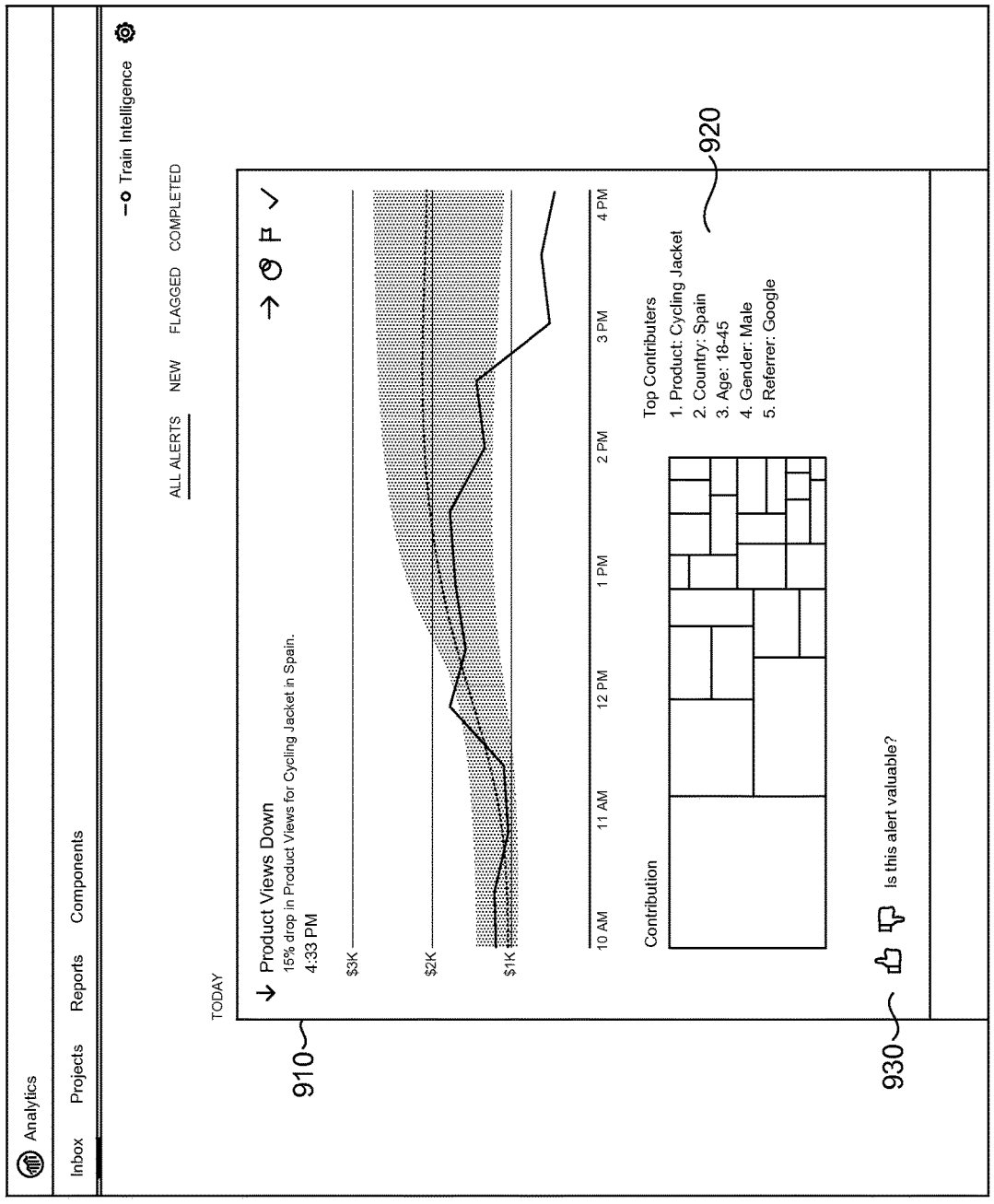
FIG. 9 is an exemplary graphical user interface illustrating intelligent alerts presented to a user with automated context, in accordance with embodiments of the present invention.

In FIG. 9, an alerts interface 900 is illustrated that includes automated context, in accordance with embodiments of the present invention. Such additional automated context is provided, for example, by selecting an alert from the interface illustrated in FIG. 8. In some embodiments, the additional context is automatically provided depending on the display currently being utilized by the user via the user device. For example, if the display is large enough to display the context, it is displayed automatically. If the display is too small, the additional context is provided only upon an alert being selected by the user. As illustrated, the alert 910 provides the user with graphical and textual information including the top contributors 920 that are likely to have caused the alert. In this way, the user may quickly identify a product or service at issue, a country or region of origin, a demographic of users contributing to the alert, or a referrer (i.e., a web page or search engine). The user is also provided an opportunity to provide feedback indicating whether or not the alert is valuable to the user. The feedback is provided via a feedback control or button 930.

Figure 10:
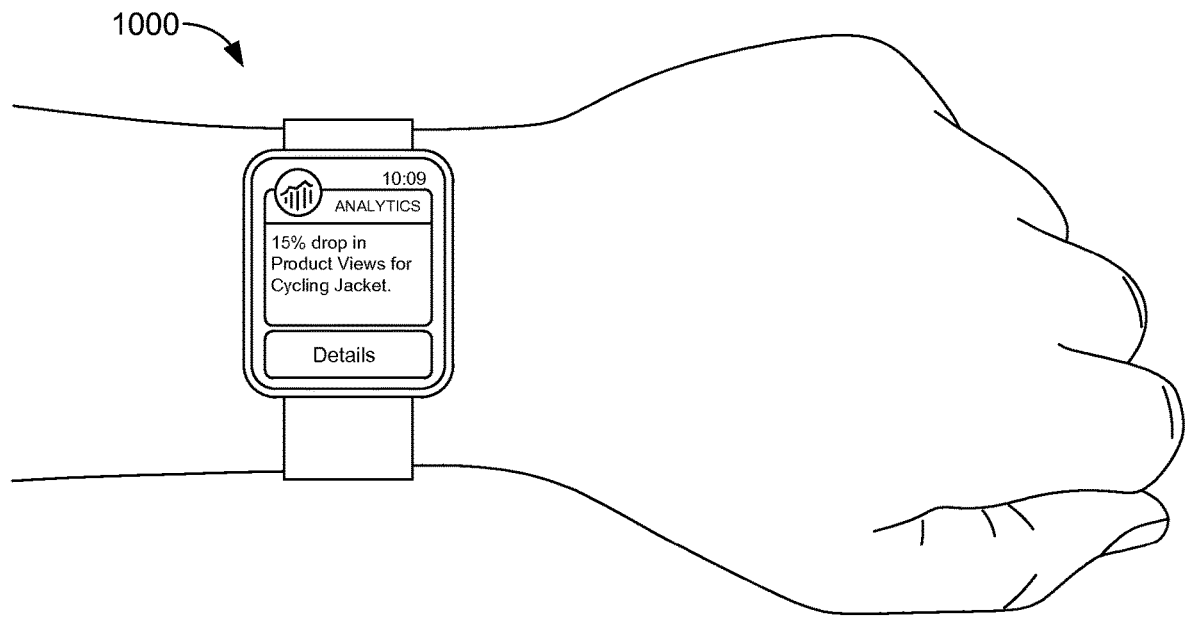
FIGS. 10-11 are an exemplary graphical user interface illustrating intelligent alerts presented via a wearable device, in accordance with embodiments of the present invention.
Figure 11:
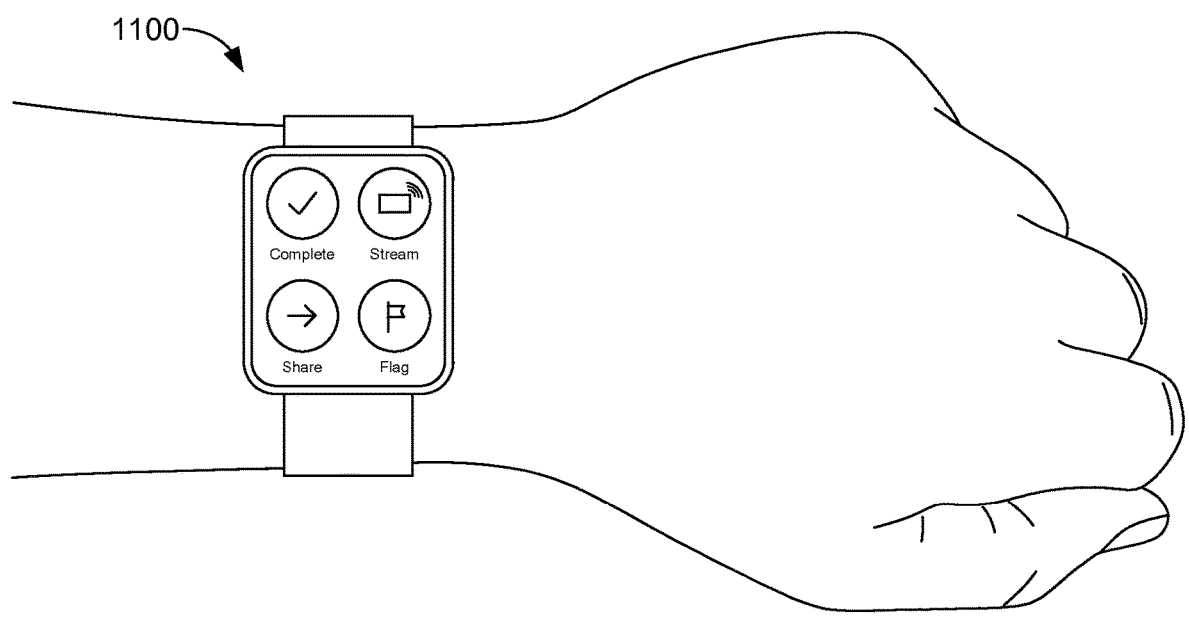

Turning now to FIGS. 10-11, alerting interfaces 1000, 1100 provided via a wearable device are illustrated in accordance with embodiments of the present invention. In FIG. 4. Referring to FIG. 10, the alerting interface 1000 includes an alert 1010 in summarized format. To select additional details, the user selects a details button 1012. Additionally, and referring now to FIG. 11, the interface 1100 provides the user additional options for each alert. For example, the user may acknowledge the alert, such as by selecting a complete button 1110. The user can also stream the alert to another device (e.g., a device with a larger display) by selecting a stream button 1120. The user may also desire to share the alert, such as by selecting a share button 1130. An alert can also be flagged for later review by selecting a flag button 1140. This may be necessary because the user is not currently available to review the alert in detail or because the user prefers to view the alert with a device with a larger display that the user may have access to at a later time.

Having described an overview of embodiments of the present invention, an exemplary computing environment in which some embodiments of the present invention may be implemented is described below in order to provide a general context for various aspects of the present invention.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Figure 12:
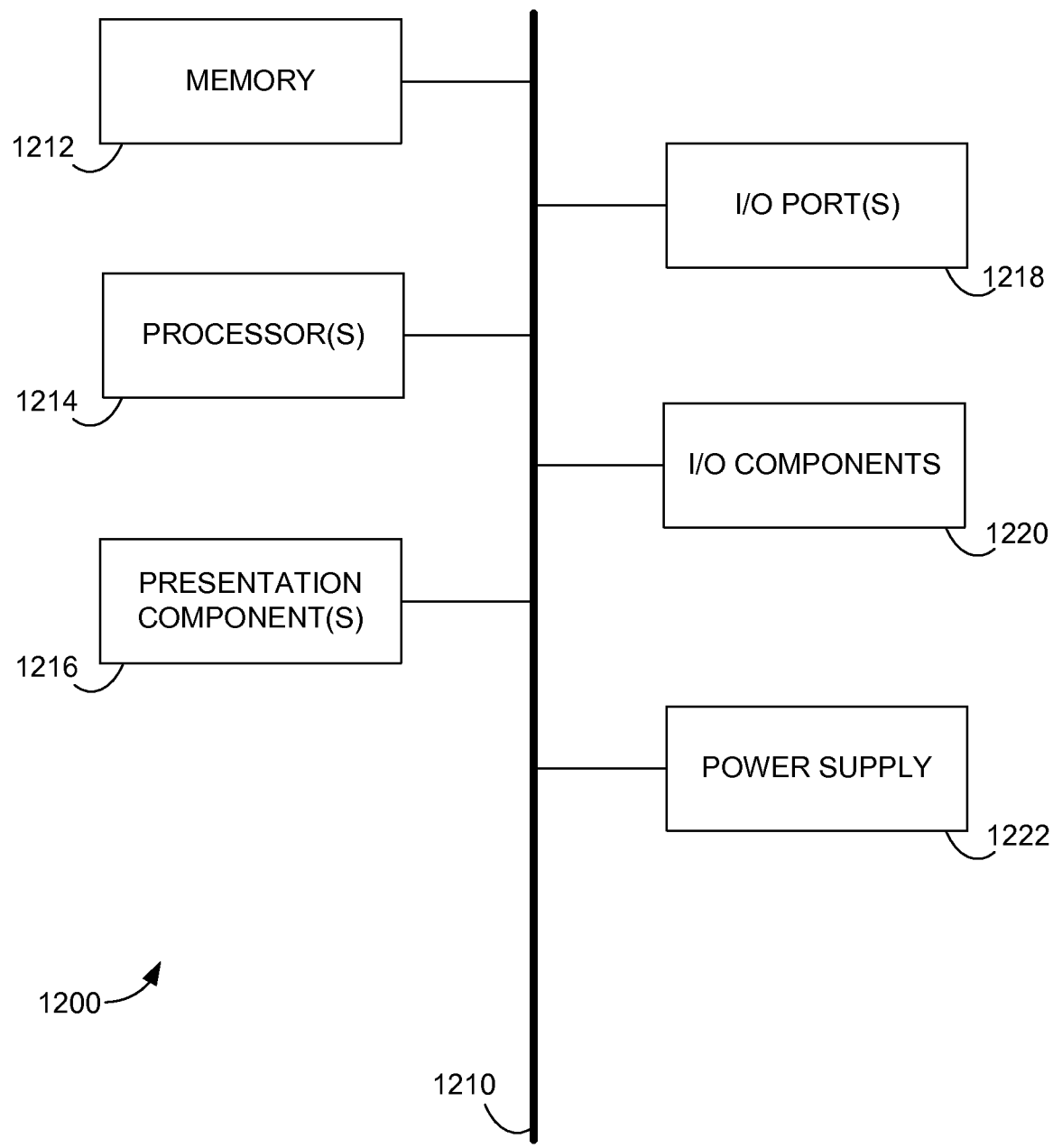
FIG. 12 is a block diagram of an exemplary system in which embodiments of the invention may be employed.

Accordingly, referring generally to FIG. 12, an exemplary operating environment for implementing embodiments of the present invention is shown and designated generally as computing device 1200. Computing device 1200 is but one example of a suitable computing environment and is not intended to suggest any limitation as to the scope of use or functionality of the invention. Neither should the computing device 1200 be interpreted as having any dependency or requirement relating to any one or combination of components illustrated.

With reference to FIG. 12, computing device 1200 includes a bus 1210 that directly or indirectly couples the following devices: memory 1212, one or more processors 1214, one or more presentation components 1216, input/output (I/O) ports 1218, input/output components 1220, and an illustrative power supply 1222. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterates that the diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer-storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc. The I/O components 1220 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1200. The computing device 1200 may be equipped with depth cameras, such as, stereoscopic camera systems, infrared camera systems, RGB camera systems, and combinations of these for gesture detection and recognition. Additionally, the computing device 1200 may be equipped with accelerometers or gyroscopes that enable detection of motion. The output of the accelerometers or gyroscopes may be provided to the display of the computing device 1200 to render immersive augmented reality or virtual reality.

As can be understood, embodiments of the present invention provide for, among other things, providing intelligent alerting and automation for marketing analytics software. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more non-transitory computer storage media storing computer-useable instructions that, when executed by at least one hardware processor, cause the at least one hardware processor to:
receive an indication to activate intelligent alerting, the intelligent alerting including activating a machine learning model to: analyze a usage pattern of marketing analytics software collected from a user, or analyze other users to identify similar users based on usage patterns of the marketing analytics software collected from the other users, the analyzing the usage pattern includes identifying a pattern of recency or frequency of the user interacting with the marketing analytics software, the analyzing the other users includes identifying patterns in how the other users interact with the marketing analytics software;

query each collected usage pattern, and analyze each usage pattern dimension for statistical significance to determine an anomaly and generate context comprising a ranked list of statistical significant contributing factors to the anomaly;

suggest an alert based on the determined anomaly;

determine respective capabilities of first and second user devices based on respective types of the first and second devices;

automatically display to a graphical user interface of the first user device, the context indicating the anomaly in a first format compatible with the capabilities of the first user device;

display to the second device more context or less context than the context displayed to the first user device based on the capabilities of the second device, such that if the second device has a larger display compared to the first device, the context is displayed automatically on the second device, and if the second device has a smaller display compared to the first device, the context is provided to the second device only upon the alert being selected by the user;

determine related alerts with respect to the selected alert and determine other alerts that are no longer relevant to the user; and deduplicate the related alerts into a single macro event and pause the other alerts that are no longer relevant to the user in order to preserve bandwidth and decrease alert fatigue.

2. The one or more non-transitory computer storage media of claim 1, wherein the stored computer-useable instructions are further executed by the at least one hardware processor to further determine that the user reviews a report at a particular rate of the usage pattern indicating an importance of the report.

3. The one or more non-transitory computer storage media of claim 1, wherein the stored computer-useable instructions are further executed by the at least one hardware processor to further analyze data queries of the marketing analytics software for combinations of segments, time granularity, metrics, dimensions, and dimension items to determine relevance of different data artifact combinations for the user.

4. The one or more non-transitory computer storage media of claim 1, wherein analyzing the other users to identify the similar users based on the usage patterns of the marketing analytics software for the other users comprises utilizing clustering models, decision trees, differences between the other users, and propensity models.

5. The one or more non-transitory computer storage media of claim 1, wherein the stored computer-useable instructions are further executed by the at least one hardware processor to further:

determine that alert will be communicated to an executive user;

prior to communicating the alert to the executive user, receive an approval indication from an analyst; and upon receiving the approval indication from the analyst, communicate the alert to the executive user.

6. The one or more non-transitory computer storage media of claim 1, wherein the stored computer-useable instructions are further executed by the at least one hardware processor to further determine the anomaly by utilizing deep learning models.

* * * * *